United States Patent [19]

Kaschke et al.

[11] Patent Number: 6,078,821
[45] Date of Patent: Jun. 20, 2000

[54] CORDLESS RADIOTELEPHONE SYSTEM HAVING AN EXTENDABLE GEOGRAPHIC COVERAGE AREA AND METHOD THEREFOR

[75] Inventors: Kevin D. Kaschke, Hoffman Estates; John Alan Kalenowsky, Palatine; Michael Peter Metroka, Algonquin, all of Ill.

[73] Assignee: Motorola, Inc., Schaumburg, Ill.

[21] Appl. No.: 09/030,663

[22] Filed: Feb. 25, 1998

[51] Int. Cl.⁷ .................................. H04B 7/00; H04Q 7/20
[52] U.S. Cl. .................... 455/507; 455/524; 455/561; 455/426; 370/343; 370/328
[58] Field of Search ........................ 455/507, 524, 455/560, 561, 436, 462, 465; 370/343, 216, 310, 318, 328, 331, 480

[56] References Cited

U.S. PATENT DOCUMENTS

| | | | |
|---|---|---|---|
| 4,578,815 | 3/1986 | Persinotti | 455/15 |
| 4,706,274 | 11/1987 | Baker et al. | 455/462 |
| 4,797,947 | 1/1989 | Labedz | 455/422 |
| 4,878,238 | 10/1989 | Rash et al. | 455/411 |
| 4,980,907 | 12/1990 | Raith et al. | 455/465 |
| 5,020,094 | 5/1991 | Rash et al. | 455/411 |
| 5,115,463 | 5/1992 | Moldavsky et al. | 455/465 |
| 5,195,127 | 3/1993 | Ichikawa et al. | 455/435 |
| 5,243,641 | 9/1993 | Evans et al. | 455/465 |
| 5,268,666 | 12/1993 | Michel et al. | 340/310.06 |
| 5,274,666 | 12/1993 | Dowdell et al. | 375/200 |
| 5,285,443 | 2/1994 | Patsiokas et al. | 370/280 |
| 5,335,357 | 8/1994 | Fennell et al. | 455/503 |
| 5,530,736 | 6/1996 | Comer et al. | 455/458 |
| 5,579,375 | 11/1996 | Ginter | 455/417 |
| 5,689,801 | 11/1997 | Frichtel et al. | 455/8 |
| 5,911,119 | 6/1999 | Bartholomew et al. | 455/402 |
| 5,918,181 | 6/1999 | Foster et al. | 455/456 |
| 5,930,721 | 7/1999 | Fried et al. | 455/466 |

FOREIGN PATENT DOCUMENTS

| | | |
|---|---|---|
| 0433256A2 | 6/1991 | European Pat. Off. . |
| 0433562A2 | 8/1991 | European Pat. Off. . |
| 0454080A2 | 10/1991 | European Pat. Off. . |
| 0454647A2 | 10/1991 | European Pat. Off. . |

(List continued on next page.)

OTHER PUBLICATIONS

Phonejak: Turns Any Electrical Outlet Into A Phone Extension; PhoneX Corporation, 4 pages.

"A Phone in Every Pocket," by M. Kawano and D. DeVaney, *Cellular Business*, Apr. 1989, pp. 52–58.

*Primary Examiner*—Reinhard J. Eisenzopf
*Assistant Examiner*—Eliseo Ramos-Feliciano
*Attorney, Agent, or Firm*—Kevin D. Kaschke; Paul J. Bartusiak

[57] ABSTRACT

A cordless telephone system (300) comprises a portable station (305), a first base station (301) and a second base station (310). The first base station (301) communicates with the portable station (305) over a communication channel (441) when the portable station (305) is located within a first geographic coverage area (311). The second base station (310) communicates with the portable station (305) over a communication channel (441) when the portable station (305) is located within a second geographic coverage area (313). The first base station (301) includes a controller (302) adaptively configured to be a master controller (302). The second base station (310) includes a controller (308) configured to be slave controller (308) responsive to the controller (302) of the first base station (301) being adaptively configured to be the master controller (302). The master controller (302) communicates with the slave controller (308) over a communication path (315) to coordinate communications between the portable station (305) and at least one of the first base station (301) and the second base station (310) when the portable station (305) is located within the first geographic coverage area (311) and the second geographic coverage area (313), respectively. The cordless telephone system (300) advantageously provides an expandable geographic coverage area for a relatively low cost when the number of portable stations are relatively small and the communication traffic is relatively low.

44 Claims, 6 Drawing Sheets

FOREIGN PATENT DOCUMENTS

| | | |
|---|---|---|
| 0454648A2 | 10/1991 | European Pat. Off. . |
| 63-252032 | 10/1988 | Japan . |
| 63-292836 | 11/1988 | Japan . |
| 64-19845 | 1/1989 | Japan . |
| 2-241126 | 9/1990 | Japan . |
| 3-29526 | 2/1991 | Japan . |
| 4-276927 | 10/1992 | Japan . |
| WO9107856 | 5/1991 | WIPO . |

— PRIOR ART —

RADIOTELEPHONE SYSTEM 100

— PRIOR ART —

CORDLESS RADIO-
TELEPHONE SYSTEM 200

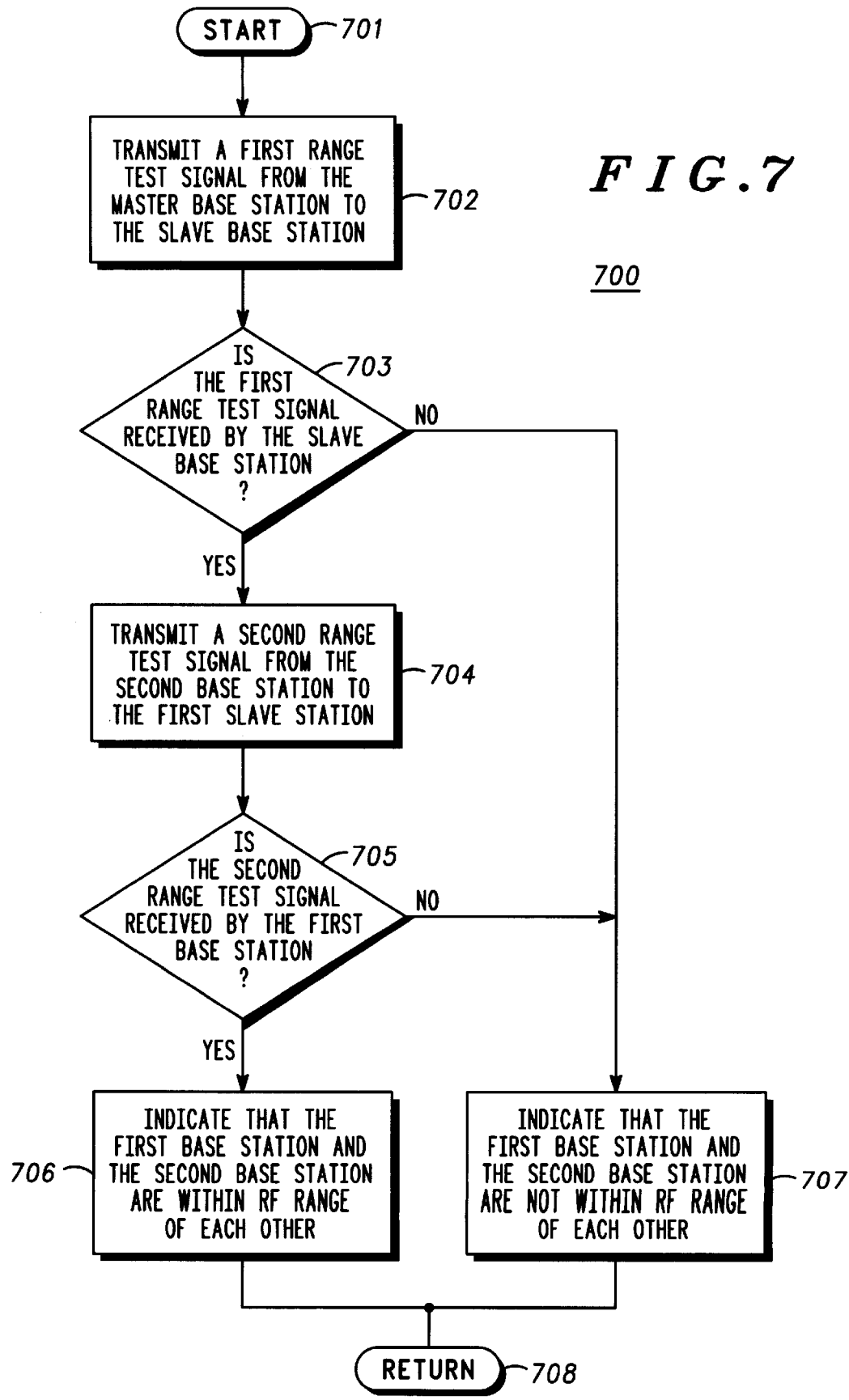

CORDLESS RADIOTELEPHONE SYSTEM HAVING AN EXTENDABLE GEOGRAPHIC COVERAGE AREA AND METHOD THEREFOR

FIELD OF THE INVENTION

The present invention generally relates to cordless radiotelephone systems and more particularly to a cordless radiotelephone system having an extendable geographic coverage area and method therefor.

BACKGROUND OF THE INVENTION

FIG. 1 illustrates a block diagram of a radiotelephone system 100 in accordance with the prior art. The radiotelephone system 100 generally comprises a controller 104, at least a first base station 106 and a second base station 108 and at least a first mobile station 10 and a second mobile station 112. The controller 104 is coupled to a public switched telephone network (PSTN) 102 which forms a landline telephone system. The base stations 106 and 108 communicate with the mobile stations 110 and 112 over radio frequency (RF) channels. The first base station 106 has a geographic coverage area 114 and the second base station 108 has a geographic coverage area 116. The mobile stations 110 and 112 can communicate with the base stations 106 and 108 when the mobile stations 110 and 112 are within the respective geographic coverage areas 1 14 and 116. The controller 104 routes calls for the mobile stations 110 and 112 between the PSTN 102 and the base stations 106 and 108 or between the base stations 106 and 108 themselves. When the geographic coverage areas 114 and 116 overlap, the controller also coordinates handoffs of the mobile stations 110 and 112 between the geographic coverage areas 114 and 116 of the base stations 106 and 108, respectively, when the mobile stations 110 and 112 are in calls. Examples of the radiotelephone system 100 include cellular radiotelephone systems and wireless private branch exchange (PBX) systems. In these types of radiotelephone systems, the base stations 106 and 108 typically have large geographical coverage areas which service many mobile stations. Because of scale and demands on these types of radiotelephone systems, they are complicated and costly to install and maintain. The cost is typically paid for by users of the mobile stations 10 and 112, such as in a cellular radiotelephone system.

FIG. 2 illustrates a block diagram of a cordless radiotelephone system 200 in accordance with the prior art. The cordless radiotelephone system 200 comprises a base station 202, including a simple, integral controller 206, and at least one portable handset 204. The base station 202 is coupled to a public switched telephone network (PSTN) 208 which forms a landline telephone system. The base station 202 communicates with the portable handset 204 over radio frequency (RF) channels. The base station 202 has a geographic coverage area 210. The portable handset 204 can communicate with the base station 202 when the portable handset 204 is within the geographic coverage area. The controller 206 directs calls between the PSTN 208 and the base station 202 for the portable handset 204. Examples of the radiotelephone system 200 include cordless phones operating at 46 to 49 MHz or at 902 to 928 MHz. In these types of radiotelephone systems, the base station 202 typically has a small geographical coverage area, such as a few hundred feet, which service one or a few portable handsets. These types of radiotelephone systems are relatively simple and inexpensive when compared to the radiotelephone system 100 of FIG. 1. A user typically bears the entire cost of the radiotelephone system 200 and it is usable with the wired connection to the PSTN for which the user already pays a subscription fee. The limited geographic coverage area of the base station 202 is widely accepted and appreciated by users because this type of radiotelephone system has a relatively low cost and provides the users greater mobility than a conventional corded telephone.

A problem with radiotelephone systems 100 and 200 is that there are few communication systems that offer communication capabilities in between the radiotelephone systems 100 and 200. For example, although the cordless radiotelephone system 200 provides low initial system cost, is usable with the wired connection to the PSTN for which the user is already paying a fee, and cordless convenience, the user may need a more range than a few hundred feet typically provided by the cordless radiotelephone system 200 of FIG. 2. The extended geographic coverage area may be desired to reach a location, relatively near to but outside the geographic coverage area 210 of the cordless telephone system 200 of FIG. 2, such as a garage, a barn or a distant location in a large building, for example. Although the radiotelephone system 100 of FIG. 1 provides greater mobility, the user is required to pay an ongoing subscription fee. Presently, the subscription fee for the radiotelephone system 100 of FIG. 1 is too expensive in order to justify reaching a location, relatively near to but outside the geographic coverage area 210 of the cordless telephone system 200 of FIG. 2.

Accordingly, there is a need for a cordless radiotelephone system having an extended geographic coverage area without incurring the additional complexity and cost associated with the radiotelephone system 100.

BRIEF DESCRIPTION OF THE DRAWINGS

FIG. 7 illustrates a flowchart describing in further detail method step 607 in FIG. 6 performed by the base station of FIG. 4 in the cordless radiotelephone system in FIG. 3.

DETAILED DESCRIPTION OF THE PREFERRED EMBODIMENTS

Figure 1:
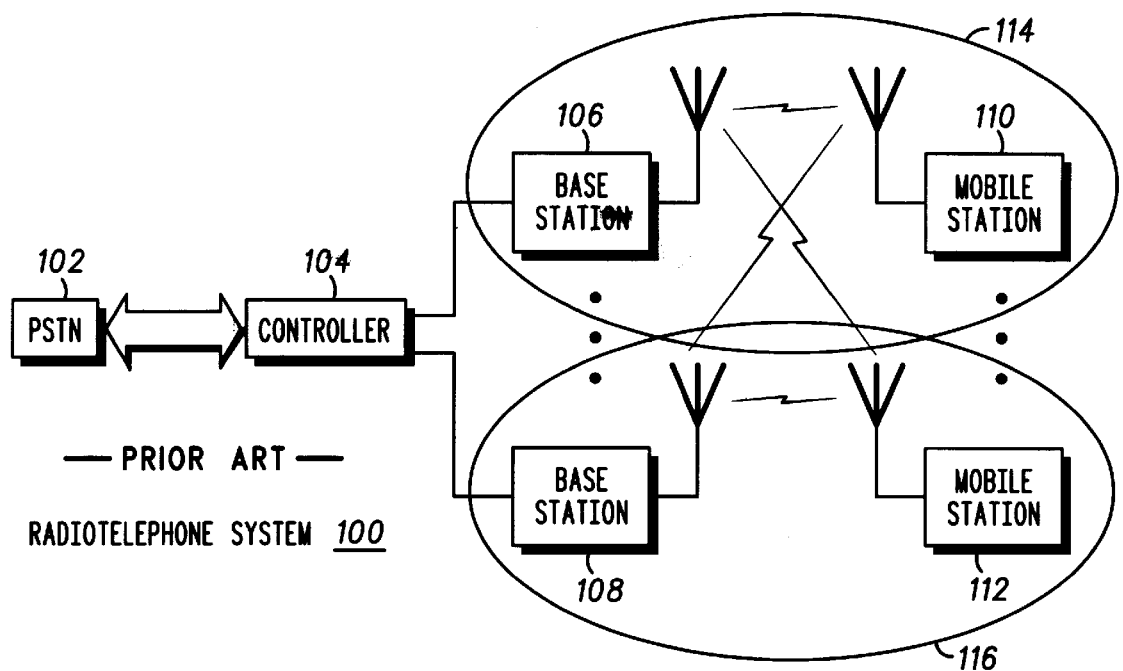
FIG. 1 illustrates a block diagram of a radiotelephone system in accordance with the prior art.
Figure 2:
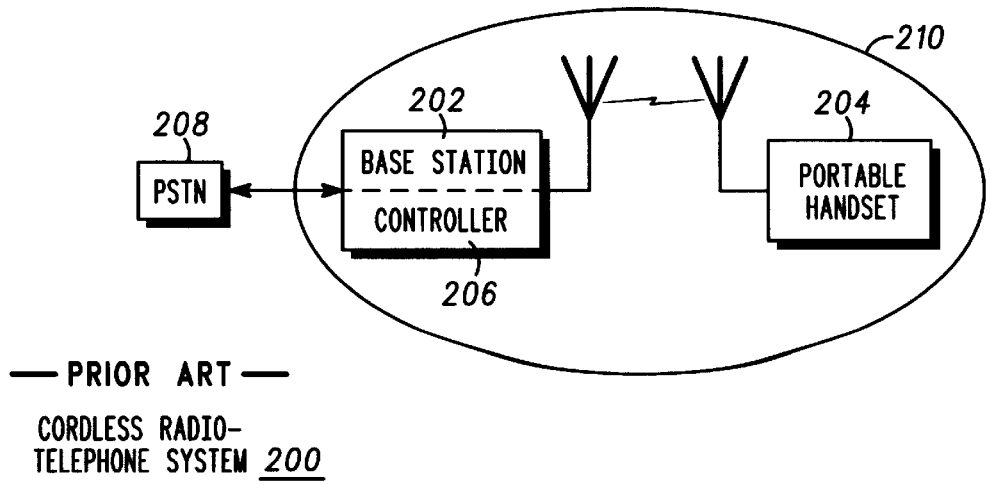
FIG. 2 illustrates a block diagram of a cordless radiotelephone system in accordance with the prior art.
Figure 3:
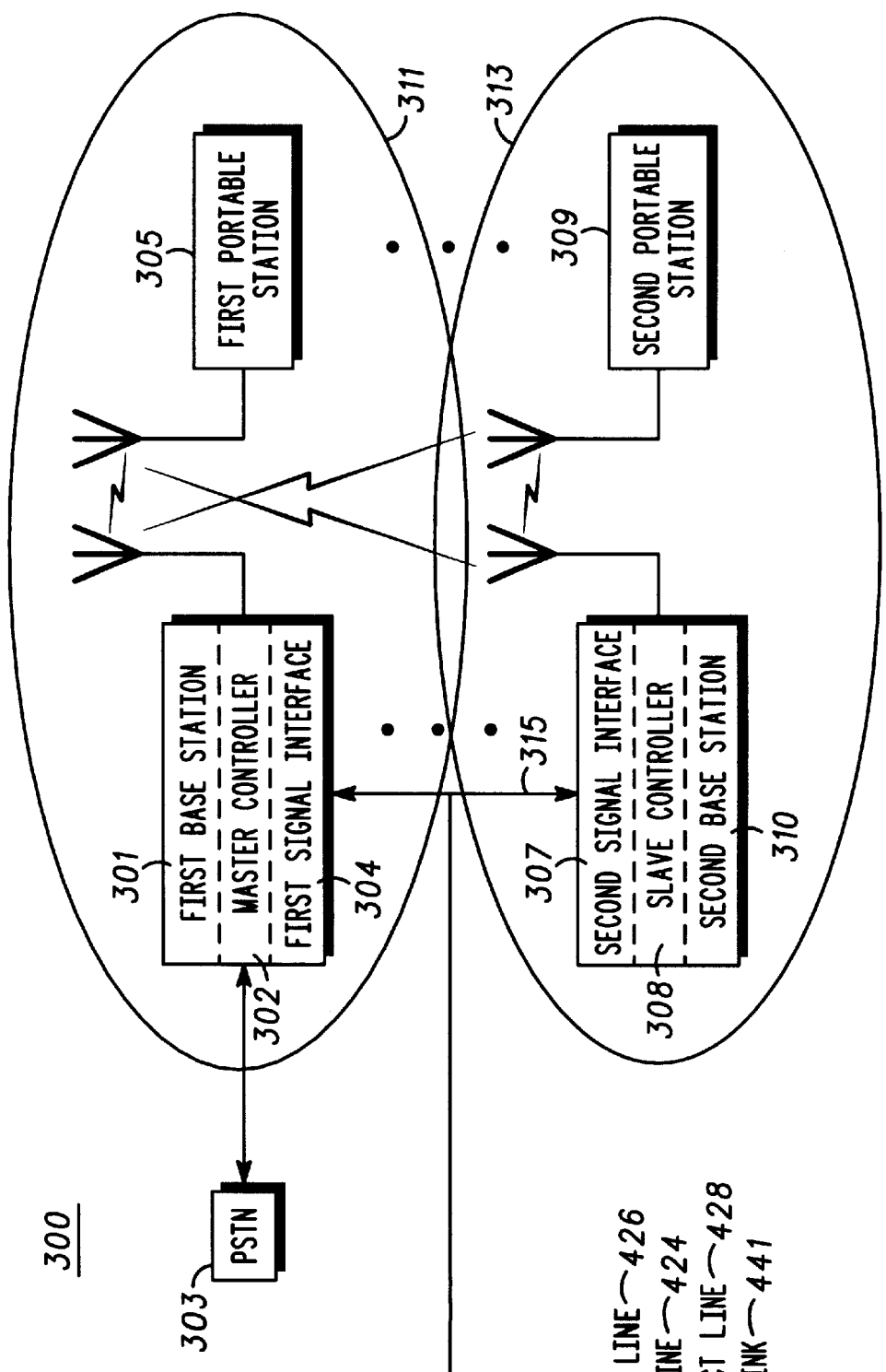
FIG. 3 illustrates a block diagram of a cordless radiotelephone system in accordance with the present invention.

FIG. 3 illustrates a block diagram of a cordless radiotelephone system 300 in accordance with the present invention. The cordless radiotelephone system 300 generally includes at least a first base station 301 coupled to a public switch telephone network (PSTN) 303 and at least one portable station 305. However, the cordless radiotelephone system 300 may include several other base stations, as exemplified by a second base station 310, and may also include several other portable stations, as exemplified by a second portable station 309. Preferably, the communications link between the first base station 301 and the PSTN 303 is a wired connection but may also be a radio link. Preferably, the communications link between the first base station 301 and at least one of the first portable station 305 and the second portable station 309 is a radio link but may also be any type of wireless connection.

Conceptually, the cordless radiotelephone system 300 provides an extended geographic coverage area when a user adds more than one base station to the cordless radiotelephone system 300. The first base station 301 has a first geographic coverage area 311 associated therewith determined by distances over which the first base station 301 can communicate with at least one of the first portable station 305 and the second portable station 309 over a wireless link. The second base station 310 has a second geographic coverage area 313 associated therewith determined by distances over which the second base station 310 can communicate with at least one of the first portable station 305 and the second portable station 309 over a wireless link. The first base station 301 and the second base station 310 each include a relatively simple controller. The controller in the first base station 301 is adaptively configured to be a master controller 302. The controller in the second base station 310 is adaptively configured to be a slave controller 308 responsive to the controller of the first base station 301 being adaptively configured to be the master controller. The master controller 302 in the first base station 301 communicates with the slave controller 308 in the second base station 310 over a communication path 315 to coordinate communications between at least one of the first base station 301 and the second base station 310 and at least one of the first portable station 305 and the second portable station 309.

The cordless telephone system 300 advantageously provides an expandable geographic coverage area for a relatively low cost when the number of base stations and portable stations are relatively small and the communication traffic is relatively low. The cost to the user of each extended geographical coverage area is essentially the cost of each additional base station. Therefore, the geographic coverage area of the cordless radiotelephone system can be arbitrarily extended or reduced by connecting or disconnecting base stations to the cordless radiotelephone system 300 as desired by a user. Further, the base stations are designed to be easily installed and maintained by the user of the cordless radiotelephone system 300 as will be explained further hereinbelow.

The base stations themselves may be located at physically fixed locations or may be located so as to move or be portable. Typically, the master base station would be located at a fixed site, since it is coupled to the PSTN. The additional slave base stations could also be located at fixed sites but may be mobile, such as being mounted on a tractor. In the case of the slave base station being mobile, the communication path 315 would preferably be an RF link to permit communications between the mobile base station and the other base station.

The first base station 301 having the master controller 302 communicates with the second base station 310 having the slave controller 308 over any one of a variety of communication paths including, but not limited to, a PSTN line, an AC line, a dedicated, direct line, or a radio frequency (RF) link. Preferably, the communication path is the PSTN line. Each communication path has advantages and disadvantages related to such things as, for example, the complexity of the technology to implement the communication path and the environment in which the cordless radiotelephone system 300 is to be installed. For example, the PSTN line or the AC line are advantageous if there is already a network of PSTN lines and AC lines installed in the geographic region anticipated to be covered by the cordless radiotelephone system 300. A direct line is advantageous because a relatively simple interface is needed to communicate messages between the first base station 301 and the second base station 310 over the direct line. The RF link is advantageous when there are no PSTN lines and AC lines installed in the geographic region anticipated to be covered by the cordless radiotelephone system 300 and when such installation would be cumbersome or expensive to route a direct line between the first base station 301 and the second base station 310. A disadvantage of the AC line is that the AC network may not be installed in such a way as to permit a control signal to travel through the AC network between the first base station 301 and the second base station 310. A disadvantage of the RF link is that the RF link may require more complex or additional circuitry to facilitate communications between the first base station 301 and the second base station 310 as well as communications between at least one of the first base station 301 and the second base station 310 and at least one of the first portable station 305 and the second portable station 309.

The first base station 301 has a first signal interface 304 and the second base station 310 has a second signal interface 307. Each signal interface configures signals appropriately to be sent and received over the communication path 315.

After the cordless radiotelephone system 300 has been configured with the desired number of base stations to cover the desired geographic coverage area, the master controller 302 of the first base station 301 communicates with the slave controller 308 of the second base station 310 using conventional master/slave communication techniques. Although a master/slave configuration and master/slave communication techniques are generally known, the master/slave configuration has not been implemented in base stations of a cordless radiotelephone system wherein controller in the base stations are adaptively configured as either the master controller or the slave controller. The method for adaptively configuring a controller in a base station as either the master controller or the slave controller will be discussed in further detail with respect to FIG. 6.

The base stations of the cordless radiotelephone system 300 are designed to extend or reduce the geographic coverage area of the cordless radiotelephone system 300 automatically such that minimum installation and maintenance is required by the user of the cordless radiotelephone system 300. Preferably, each of the base stations would be manufactured with the same electrical, software and mechanical design such that a controller in each base station could be configured as either the master controller or the slave controller. After a user purchases one base station/portable station combination package, the user could later purchase one or more additional base stations to extend the coverage area of the cordless radiotelephone system 300 by simply "plugging" it or them into the cordless radiotelephone system 300. The software in the base stations would do the rest of the work to properly configure the cordless radiotelephone system 300. Thereafter, one or more of the base stations could be disconnected from the cordless radiotelephone system 300 or temporarily lose power and the novel communication system would continue operating without any user intervention.

Figure 4:
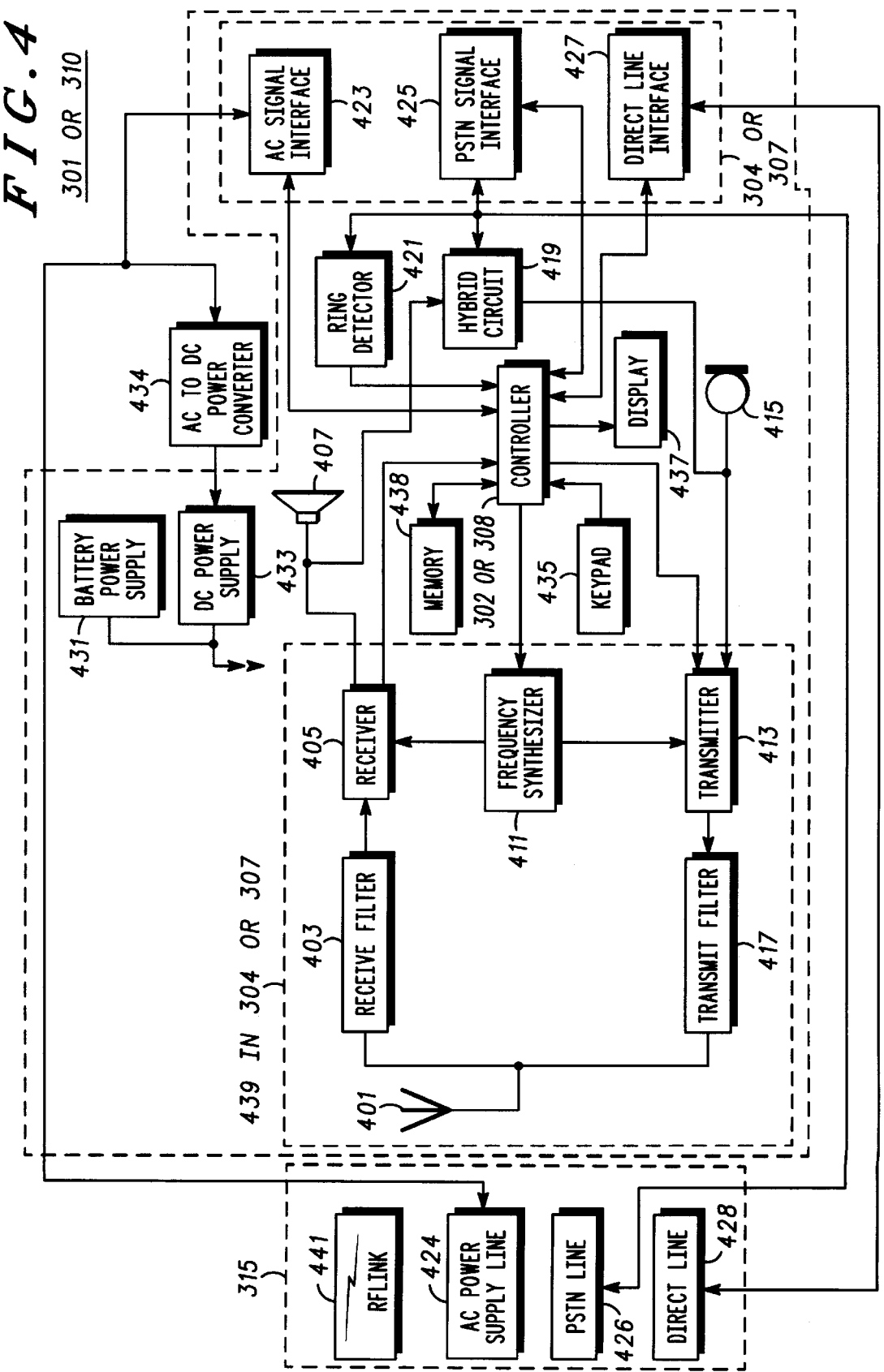
FIG. 4 illustrates a block diagram of a base station for use in the cordless radiotelephone system of FIG. 3.

FIG. 4 illustrates a block diagram of the first base station for use in the cordless radiotelephone system of FIG. 3. Preferably, the block diagram as shown in FIG. 4 is identical for the first base station 301 and the second base station 310. The first base station 301 generally includes an antenna 401, a receive filter 403, a receiver 405, a speaker 407, a controller 302 or 308, a frequency synthesizer 411, a transmitter 413, a microphone 415, a transmit filter 417, a hybrid circuit 419, a ring detector 421, a signal interface 304 or 307 including at least one of an AC signal interface 423 adapted to be connected to the AC line 424 of the communication path 315, a PSTN signal interface 425 adapted to be connected to the PSTN line 426 of the communication path 315, a direct line interface 427 adapted to be connected to the direct line 428 of the communication path 315, and an RF interface 439 adapted to be coupled to the RF link 441 of the communication path 315, a battery power supply 431, a DC power supply 433, a keypad 435, a display 437 and memory 438. Individually, each block of the first base station 301 is well known in the art. Preferably, the first portable station 305 is a cordless radiotelephone base station adapted to communicate in the 46/49 MHz frequency band having a typical range of several hundred feet, but may operate in any legally usable frequency band, such as the 902–928 MHz frequency band having a typical range of one-half to one mile. The memory 438 stores a base station identification code and a cordless radiotelephone system identification code.

A signal received by the antenna 401 is filtered through the receive filter 403 and processed by the receiver 405 to produce a received signal. The received signal is coupled to the earpiece 407, the controller 302 and the hybrid circuit 419. The controller 302 routes the received signal to at least one of the earpiece 407, the hybrid circuit 419 and the signal interface 304 to facilitate communications between the first portable station 305 and at least one of the first base station 301, the PSTN and the second base station 310, respectively. The controller 302 also routes a transmit signal from at least one of the microphone 415, the hybrid circuit 419 and the signal interface 304 to facilitate communications between at least one of the first base station 301, the PSTN and the second base station 3 10, respectively, and the first portable station 305. Note that the receiver 405, the transmitter 413, the frequency synthesizer 411 and the antenna 401 generally provide the RF interface 439 coupled to the RF link 441 of the communication path 315.

The transmitter 413 is adapted to receive a signal generated by the microphone 415 or the controller 302. The transmitter 413 generates a transmit signal which is filtered by the transmit filter 417 and radiated by the antenna 401. The controller is also coupled to the keypad 435 and the display 437 to provide a user interface for the first base station 301. The controller is also coupled to the ring detector 421 to detect an incoming call from the PSTN line 426 to the first base station 301. The first base station 301 also includes the DC power supply 433 for converting 12V DC power into 5V DC power for use by the circuitry in the first base station 301. The first base station 301 also includes the battery power supply 431 for use by the circuitry in the first base station 301 as a backup power supply in the case of an AC power failure. The controller 302 is coupled to the frequency synthesizer 411. which is in turn coupled to the receiver 405 and the transmitter 413, to control the frequency of the receive signal and the transmit signal, respectively.

The PSTN signal interface 425 adapted to be connected to the PSTN line 426 of the communication path 315 is generally well known in the art as the hybrid circuit 419. The AC signal interface 423 adapted to be connected to the AC line 424 of the communication path 315 is generally well known in the art, for example, as a CE-BUS (TM) standard promulgated by the Electronic Industries Association and described in U.S. Pat. No. 5,268,666, herein incorporated by reference or as Phonejak (TM) extension phone system provided by Phonex Corporation, 6952 High Tech Drive, Midvale, Utah 84047-3756. The direct line interface 427 adapted to be connected to the direct line 428 of the communication path 315 is generally implemented as a standard bus interface. The RF interface 439 coupled to the RF link 441 of the communication path 315 may be implemented as a time division multiple access, for example, communication system to support base to base communication as well as base to portable communication simultaneously.

The blocks of the first base station 301 which are generally not included in conventional base stations of cordless radiotelephone systems include the signal interface 304 or 307 including at least one of the AC signal interface 423 adapted to be connected to the AC line 424 of the communication path 315, the PSTN signal interface 425 adapted to be connected to the PSTN line 426 of the communication path 315 and the direct line interface 427 adapted to be connected to the direct line 428 of the communication path 315. Although the signal interface 304 or 307 shows various interface options, the first base station 301 does not need all interface options in the same base station. Preferably, the base station is designed for only one desired signal interface such as the PSTN interface. Further, the software stored in the memory 438 for controlling the configuration of the controller 302 as either a master controller or a slave controller, as described in FIG. 6, is also generally not included in conventional base stations of cordless radiotelephone systems.

Figure 5:
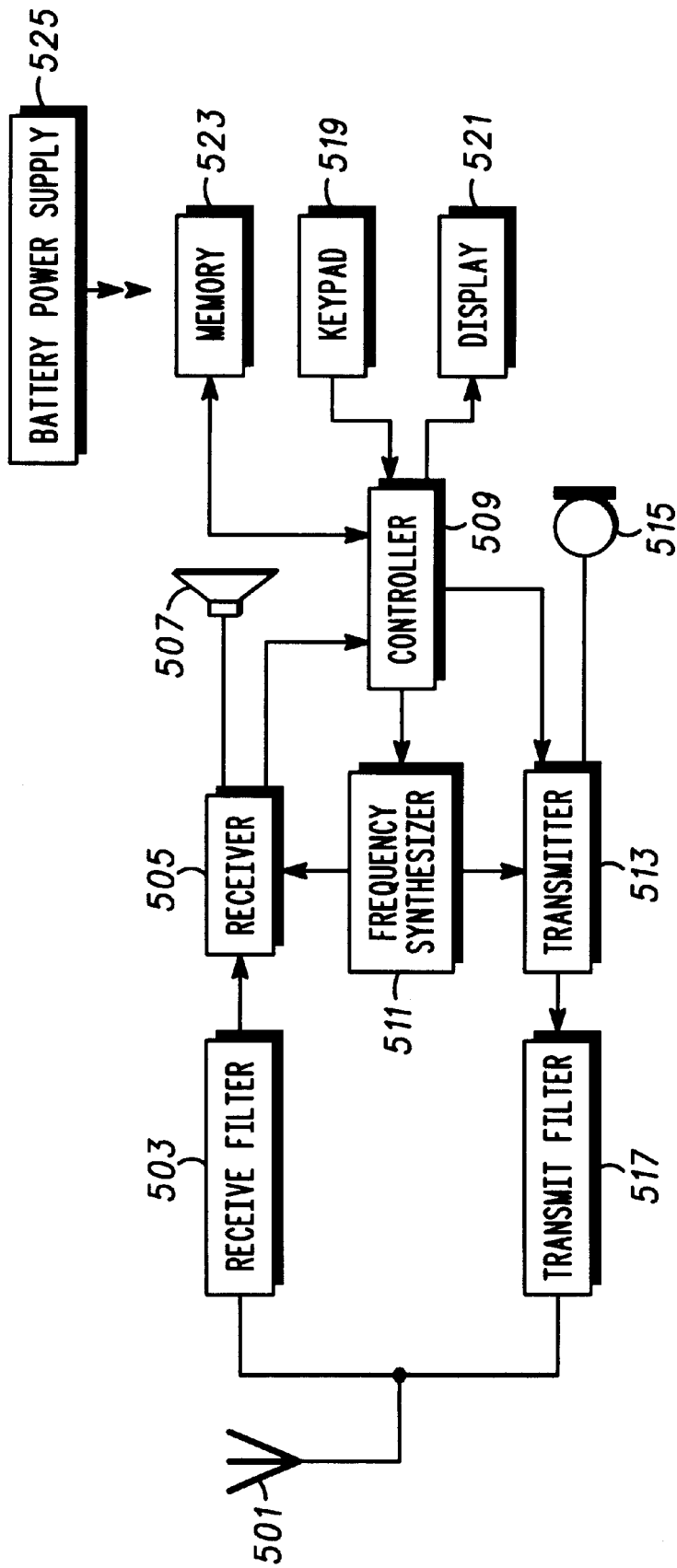
FIG. 5 illustrates a block diagram of a portable station for use in the cordless radiotelephone system of FIG. 3.

FIG. 5 illustrates a block diagram of a portable station for use in the cordless radiotelephone system of FIG. 3. Preferably, the block diagram as shown in FIG. 5 is identical for the first portable station 305 and the second portable station 309. The first portable station 305 generally includes an antenna 501, a receive filter 503, a receiver 505, a speaker 507, a controller 509, a frequency synthesizer 511, a transmitter 513, a microphone 515, a transmit filter 517, a keypad 519, a display 521, a memory 523 and a battery power supply 525. Individually and collectively, each block of the first portable station 305 and the connections and functions thereof are well known in the art and may have a variety of circuit arrangements and functions. Preferably, the first portable station 305 is a cordless radiotelephone base station adapted to communicate in the 46/49 MHz frequency band having a typical range of several hundred feet, but may operate in any legally usable frequency band, such as the 902–928 MHz frequency band having a typical range of one-half to one mile. The memory 523 stores a portable station identification code and a cordless radiotelephone system identification code.

Figure 6:
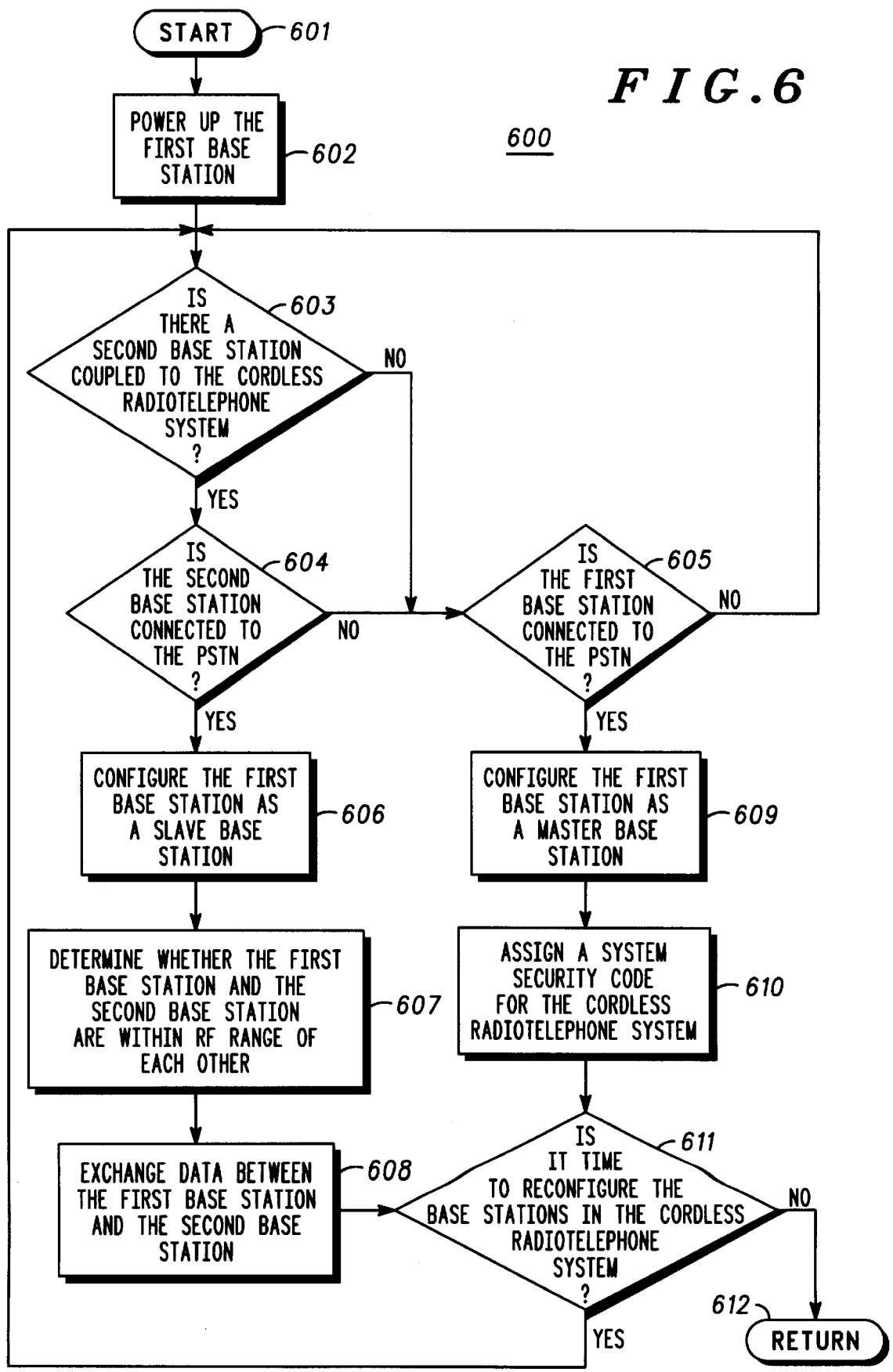
FIG. 6 illustrates a flowchart describing a method performed by the base station of FIG. 4 in the cordless radiotelephone system in FIG. 3.

FIG. 6 illustrates a flowchart describing a method 600 performed by the base station 301 or 310 of FIG. 4 in the cordless radiotelephone system 300 in FIG. 3. The flowchart illustrates how and when a particular base station configures its controller as a master controller or a slave controller. The method 600 is preferably an executable program stored in the memory 438, as shown in FIG. 4 and acted upon by the controller 302 or 308, as shown in FIG. 4.

The method 600 is described with reference to a first base station and a second base station in order to describe a system with more than one base station. However, the first base station is not necessarily meant to literally mean the base station first power up, coupled to the cordless radiotelephone system 300, or coupled to the PSTN, etc. The same nonliteral interpretation applies to the second base station. Further, the base stations do not need to be power up, coupled to the cordless radiotelephone system 300, or coupled to the PSTN, in any particular order. Moreover, although only two base stations are described in FIG. 6, any number of base stations may be employed in the cordless radiotelephone system 300.

The method 600 starts at step 601. At step 602, the user powers up the first base station 301 by pressing a power key on the keypad 435, for example, using power from either the AC power line 424 or the battery power supply 431. Practically, the first base station 301 needs to be powered up before the controller 302 can operate to execute the method 600. If the first base station 301 does not have any power from either the AC power line 424 or the battery power supply 431, the controller 302 cannot operate and the program does not execute.

Next, at step 603, the first base station 301 determines if there is a second base station 310 coupled to the cordless radiotelephone system 300. The first base station 301 performs this determination, for example, by actively sending out messages over the communication path 315 to any other base station and/or by passively listening to the communication path 315 for messages periodically sent by other base stations. Preferably, the first base station 301 waits a predetermined amount of time for a second base station 310 to reply to a query generated by the first base station 301.

The first base station 301 may be coupled to the cordless radiotelephone system 300 via the communication path 315, including at least one of the PSTN line 426, the AC line 424, the direct line 428 and the RF link 441. The first base station 301 may check one or more alternatives of the communication path 315 depending on the design of the first base station 301. The communication path 315 provides the means by which a user can extend or reduce the geographic coverage area of the cordless radiotelephone system 300 to permit the user to effectively build their own private extended cordless radiotelephone system 300. Since the entire cordless radiotelephone system 300 is connected to one of the user's PSTN lines, the user can advantageously install and maintain the extended cordless radiotelephone system 300 without paying for a monthly service for an additional phone line. Further, if the extended range is adequate for the user, the user may also avoid paying for a license to use a two-way land mobile system or avoid paying for a monthly cellular subscriber fee. The cordless radiotelephone system 300 may be extended using only one type of the communication path 315, such as only the RF link 441, or by using a combination of types of the communication path 315, such as the RF link 441 between the first base station 301 and the second base station 310 and the PSTN line 426 between the second base station 310 and a third base station (not shown). The types or combinations of the communication path 315 employed in the base stations for extension of the cordless radiotelephone system 300 is a design consideration for the base stations that depends upon such factors as cost, user preference, anticipated application, etc. Preferably, each of the base stations are designed with the same types or combinations of the communication path 315 employed to provide a convenient way for a user to initially install one or more base stations and to extend or reduce the cordless radiotelephone system 300 in the future as the need arises.

If the determination at step 603 is positive, indicating that there is a second base station 310 coupled to the cordless radiotelephone system 300, then, at step 604, the first base station 301 determines if the second base station 310 is connected to the PSTN. The second base station 310 may be connected to the PSTN either directly via a RJ-11 jack or indirectly via the aforementioned Phonejak (TM) extension phone system provided by Phonex Corporation. The first base station 301 performs the determination at step 604, for example, by actively sending out messages over the communication path 315 to any other base station and/or by passively listening to the communication path 315 for messages periodically sent by other base stations. Preferably, the first base station 301 waits a predetermined amount of time for a second base station 310 to reply to a query generated by the first base station 301.

If the determination at step 604 is positive, indicating that the second base station 310 is coupled to the PSTN, then, at step 606, the first base station configures its controller 302 as a slave controller thereby effectively making the first base station 301 a slave base station. The controller 302 is configured as the slave controller by selecting particular program subroutines or sequences to be executed by a slave controller as opposed to a master controller. Therefore, in this case, the first base station 301 was in fact installed into the cordless radiotelephone system 300 after the second base station 310.

Returning to step 603, if the determination at step 603 is negative, indicating that there is not a second base station 310 coupled to the cordless radiotelephone system 300, then, at step 605, the first base station 301 determines if the first base station 301 is connected to the PSTN. The second base station 310 may be connected to the PSTN either directly via a RJ-11 jack or indirectly via the aforementioned Phonejak (TM) extension phone system provided by Phonex Corporation. The first base station 301 performs the determination at step 605, for example, by sensing a carrier tone on the 16 Hz detector 421.

If, at step 605, the first base station 301 is determined to be coupled to the PSTN, then the first base station 301 configures its controller 302 as the master controller thereby effectively making the first base station 301 the master base station. The controller 302 is configured as the master controller by selecting particular program subroutines or sequences to be executed by a master controller as opposed to a slave controller. Therefore, in this case, the first base station 301 was in fact installed into the cordless radiotelephone system 300 before the second base station 310. Hence, the base station that is powered up and coupled to the PSTN first in time becomes the master base station.

If, at step 605, the first base station 301 is determined not to be coupled to the PSTN, then the method returns to step 603 to repeat the method beginning with step 603. Therefore, in this case, the first base station 301 is powered up but does not detect any other base stations in the cordless radiotelephone system 300 and is not coupled to the PSTN. Hence, the first base station 301 cannot provide communications.

Returning to step 606, after the first base station 301 is configured as a slave base station, then the flow continues to step 607 wherein the first base station 301 determines whether the first base station 301 and the second base station 310 are within RF range of each other. Further details of step 607 are described in FIG. 7 hereinbelow.

Next, at step 608, the master controller 302 of the first base station 301 and slave controller 308 of the second base station 310 then exchange data to permit the master controller 302 and slave controller 308 to communicate over the communication path 315. The data exchanged may include, but is not limited to, a slave number assignment if more than one slave is coupled to the cordless communication system 300, a system security code if desirable, RF range information, channel information, portable station security code, portable station registration information, etc.

Returning to step 609, after the first base station 301 is configured as a master base station, then the flow continues to step 610 wherein the first base station 301 assigns the cordless telephone system 300 a system identification code for security purposes and to reduce potential interference from nearby systems. Note that step 610 is optional and may be performed automatically by the first base station 301 or manually by the user. The need for the system security code is dependent on the communication path between base units of a particular communication system. A communication path formed by the RF link 441 would need the system security code because there is a chance that another base unit not intended for use with the expanded system may interfere with the base units of the expanded system. A communication path formed by the PSTN line 426, an AC line 424 and a direct line 428, however, typically would not need a system security code since the nature of the PSTN line 426, an AC line 424 and a direct line 428 creates a closed system that is not subject to interference. The AC line may need a system security code depending on the layout of the AC lines of the user in relation to another AC lines for other users. Therefore, a system security code may be needed in the AC line situation.

After one of steps 608 and 610 is completed, the flow continues to step 611 wherein it is time to reconfigure the base stations in the cordless communication system 300. Anyone of the base stations in the cordless communication system 300 can make this determination. This determination may be responsive to detecting an occurrence of a predetermined condition including, but not limited to, an indication that one of the base stations was disconnected from the cordless communication system 300, a loss of power from the cordless communication system 300, an expiration of a random time or an expiration of a predetermined time. Alternatively, once having configured itself as the master controller, the master controller can set it's time delay to be in a certain range that will be shorter than the "standard" reconfiguration time delay for other base stations in the system, such that, in the event of a complete system power interruption that the master controller will be the first to initiate the reconfiguration sequence. The base station that was the master controller before the power interruption would become the master once again, following the power restoration. Further, in the event that a request from more than one base causes a collision between base unit requests, standard collision avoidance techniques can be used to negotiate the collision. If it is not time to reconfigure the base stations at step 610, then the method continues to step 611 wherein the base station 301 or 310 returns to perform other functions.

If the determination at step 611 is positive, then the method 600 returns to step 603 to repeat the reconfiguration process. Otherwise, if the determination at step 611 is negative, the method continues to step 612 wherein the controller returns to execute other tasks.

Thus, the cordless communication system 300 is been configured to provide an extended coverage area without any user involvement other than applying power to the base station and coupling the base station to the communication path 315. A user does not need any particular technical expertise to set up the cordless communication system 300. However, the user does need to have some basic knowledge of the communication path 315 chosen for use by the additional base stations. For example, the first base station 301 and the second base station 310 must be connected to the same PSTN line 426 and not two separate phone lines or they must be connected to a common AC power line feeding off of a common electrical meter. Further, for example, if the RF link 441 is used for the communication path 315, the first base station 301 and the second base station 310 must be within a RF transmission range of each other as determined by FIG. 7.

FIG. 7 illustrates a flowchart 700 describing in further detail method step 608 in FIG. 6 performed by the base station of FIG. 4 in the cordless radiotelephone system 300 in FIG. 3. The flowchart begins at step 701. At step 702 the first base station 301 transmits a first range test signal to the second base station 310. Next, at step 703, the second base station determines if the first range test signal was received from the first base station 301. If the determination at step 703 is negative, then the flow continues to step 707 wherein the second base station indicates to the user that the first base station 301 and the second base station 310 are not within a RF range of each other for communication purposes. If the determination at step 703 is positive, then the flow continues to step 704 wherein the second base station 310 transmits a second range test signal to the first base station 301. At step 705, the first base station 301 determines whether it received the second range test signal from the second base station 310. Typically, the first base station 301 makes this determination by waiting a predetermined period of time for a reply from the second base station after sending out the first range test signal. If the determination at step 705 is negative, then the flow continues to step 707 wherein the second base station indicates to the user that the first base station 301 and the second base station 310 are not within a RF range of each other for communication purposes. However, if the determination at step 705 is positive, then the flow continues to step 706 wherein the second base station indicates to the user that the first base station 301 and the second base station 310 are indeed within a RF range of each other for communication purposes.

Generally, the flowchart 700 illustrates the exchange of RF range information between two or more base stations to determine if their RF coverage areas overlap such that a portable unit can handoff between base units during communication. When a RF link 441 is used as the communication path 315 between the base stations, the RF range information must be exchanged and provided to the user enabling the portable station's messages to reach the PSTN. If a base unit is within range of at least one other base unit, an indicator such as a light on the base station's display illuminates to notify the user that it is within range. Thus, the user can adjust the location of additional base units if necessary to permit continuous communication between base stations. When one of the PSTN line 426, the AC line 424 or the direct line 428 is used as the communication path, the base stations may be separated by a distance such that a portable station cannot handoff a call between base stations.

In summary, unique, identical base stations are employed in the cordless radiotelephone system 300 and are automatically reconfigured to extend or reduce the geographic coverage area of the cordless radiotelephone system 300. Any number of base stations or portable stations may be employed as designed by the manufacturer or desired by the user. The extended range of geographic coverage area depends on the range of the communication path 315 to permit the user to build a private cordless radiotelephone system 300. With such a system, a user enjoys more widespread, private communication capabilities without paying additional subscriber fees.

What is claimed is:

1. An extendable cordless telephone system including a first base station covering a first geographic area and having a first controller, the first base station for communicating with at least one portable station when the at least one portable station is located within the first geographic area, the extendable cordless telephone system comprising:

a second base station covering a second geographic coverage area and having a second controller;

the first base station to determine whether any of the first base station and the second base station is coupled to a public switched telephone network (PSTN) and to determine whether the second base station is coupled to the cordless telephone system;

wherein when it is determined that the first base station is coupled to the PSTN and the second base station is not coupled to the cordless telephone system, the first controller is adapted to act as a master controller to coordinate communications between the at least one portable station and the first base station when the at least one portable station is within the first geographic coverage area, and when it is determined that the first base station is coupled to the PSTN and the second base station is coupled to the cordless telephone system and the PSTN, the first controller is adapted to act as the master controller and the second controller is adapted to act as a slave controller, wherein the slave controller is adapted to communicate with the master controller over a communication path to coordinate communications between the at least one portable station and the first base station when the at least one portable station is within the first geographic area and the second base station when the at least one portable station is within the second geographic area.

2. A cordless telephone system according to claim 1 wherein the communication path is a radio frequency channel.

3. A cordless telephone system according to claim 1 wherein the communication path is a telephone wireline of the public switched telephone network.

4. A cordless telephone system according to claim 1 wherein the communication path is an alternating current power supply line.

5. A cordless telephone system according to claim 1 wherein the communication path is a dedicated, direct wireline.

6. A cordless telephone system according to claim 1 wherein the first geographic coverage area at least partially overlaps the second geographic coverage area.

7. A cordless telephone system according to claim 1 wherein the first geographic coverage area does not overlap the second geographic coverage area.

8. A cordless telephone system according to claim 1 wherein the cordless telephone system reconfigures itself responsive to an occurrence of a predetermined condition.

9. A cordless telephone system according to claim 8 wherein the occurrence of the predetermined condition further comprises an expiration of a random time.

10. A cordless telephone system according to claim 8 wherein the occurrence of the predetermined condition further comprises an expiration of a predetermined time.

11. A cordless telephone system according to claim 8 wherein the occurrence of the predetermined condition further comprises at least one of the first base station and the second base station being temporarily disconnected from a power source.

12. A cordless telephone system according to claim 8 wherein the occurrence of the predetermined condition further comprises at least one of the first base station and the second base station being disconnected from the cordless telephone system.

13. A method for extending a cordless telephone system including a first base station, having a first controller, for communicating with at least one portable station over a communication channel when the at least one portable station is located within a first geographic coverage area, the method, performed by the first base station, comprising the steps of:

a) determining whether a second base station is coupled to the cordless telephone system, wherein the second base station, having a second controller, is adapted to communicate with the at least one portable station over a communication channel when the at least one portable station is within a second geographic coverage area;

b) determining whether the second base station is coupled to a public switched telephone network;

c) determining whether the first base station is coupled to the public switched telephone network;

d) configuring the first controller of the first base station as a master controller responsive to determining that the second base station is not coupled to the cordless telephone system and responsive to determining that the first base station is coupled to a public switched telephone network, wherein the master controller of the first base station is adapted to coordinate communications between the at least one portable station and the first base station when the at least one portable station is located within the first geographic coverage area; and e) configuring the first controller of the first base station as a slave controller responsive to determining that the second base station is coupled to the cordless telephone system and responsive to determining that the second base station is coupled to the public switched telephone network, wherein the second controller of the second base station is configured as a master controller, wherein the slave controller of the first base station is adapted to communicate with the master controller of the second base station over a communication path to coordinate communications between the portable handset and at least one of the first base station and the second base station within the first geographic coverage area and the second geographic coverage area, respectively.

14. A method according to claim 13 wherein the communication path is a radio frequency channel.

15. A method according to claim 13 wherein the communication path is a telephone line of the public switched telephone network.

16. A method according to claim 13 wherein the communication path is an alternating current power supply line.

17. A method according to claim 13 wherein the communication path is a dedicated, direct line connection.

18. A method according to claim 13 wherein the first geographic coverage area at least partially overlaps the second geographic coverage area.

19. A method according to claim 13 wherein the first geographic coverage area does not overlap the second geographic coverage area.

20. A method according to claim 13 further comprising the steps of:

detecting an occurrence of a predetermined condition responsive to the first controller of the first base station being configured as one of the master controller and the slave controller; and repeating the steps a) through e) responsive to the occurrence of the predetermined condition.

21. A method according to claim 20 wherein the occurrence of the predetermined condition further comprises an expiration of a random time.

22. A method according to claim 20 wherein the occurrence of the predetermined condition further comprises an expiration of a predetermined time.

23. A method according to claim 20 wherein the occurrence of the predetermined condition further comprises at least one of the first base station and the second base station being temporarily disconnected from a power source.

24. A method according to claim 20 wherein the occurrence of the predetermined condition further comprises at least one of the first base station and the second base station being disconnected from the cordless telephone system.

25. A method according to claim 13 further comprising the steps of:

determining whether the first base station is within the second geographic coverage area of the second base station; and determining whether the second base station is within the first geographic coverage area of the first base station.

26. A method according to claim 25:

wherein the step of determining whether the first base station is within the second geographic coverage area of the second base station further comprising the steps of:

transmitting a first signal by the first base station; and
receiving the first signal by the second base station; and wherein the step of determining whether the second base station is within the first geographic coverage area of the first base station further comprising the steps of:

transmitting a second signal by the second base station responsive to receiving the first signal; and
receiving the second signal by the first base station.

27. A method according to claim 13 further comprising the steps of:

assigning a system security code to at least the first base unit responsive to the first controller of the first base station being configured as the master controller.

28. A method according to claim 13 further comprising the steps of:

exchanging data between the first base station and the second base station responsive to the first controller of the first base station being configured as the slave controller.

29. A method according to claim 13 further comprising the steps of:

repeating steps a), b) and c) responsive to determining that the second base station is not coupled to the cordless telephone system and responsive to determining that the first base station is not coupled to a public switched telephone network.

30. A method for extending a cordless telephone system including a first base station, having a first controller, for communicating with at least one portable station over a communication channel when the at least one portable station is located within a first geographic coverage area, the method, performed by the first base station, comprising the steps of:

a) determining whether a second base station is coupled to the cordless telephone system, wherein the second base station, having a second controller, is adapted to communicate with the at least one portable station over a communication channel when the at least one portable station is within a second geographic coverage area;

b) determining whether the second base station is coupled to a public switched telephone network;

c) determining whether the first base station is coupled to the public switched telephone network;

d) configuring the first controller of the first base station as a master controller responsive to determining that the second base station is not coupled to the cordless telephone system and responsive to determining that the first base station is coupled to a public switched telephone network, wherein the master controller of the first base station is adapted to coordinate communications between the at least one portable station and the first base station when the at least one portable station is located within the first geographic coverage area; and e) configuring the first controller of the first base station as a slave controller responsive to determining that the second base station is coupled to the cordless telephone system and responsive to determining that the second base station is coupled to the public switched telephone network, wherein the second controller of the second base station is configured as a master controller, wherein the slave controller of the first base station is adapted to communicate with the master controller of the second base station over a communication path to coordinate communications between the portable handset and at least one of the first base station and the second base station within the first geographic coverage area and the second geographic coverage area, respectively;

f) repeating steps a), b) and c) responsive to determining that the second base station is not coupled to the cordless telephone system and responsive to determining that the first base station is not coupled to a public switched telephone network;

g) detecting an occurrence of a predetermined condition responsive to the first controller of the first base station being configured as one of the master controller and the slave controller; and h) repeating the steps a) through f) responsive to the occurrence of the predetermined condition.

31. A method according to claim 30 wherein the communication path is a radio frequency channel.

32. A method according to claim 30 wherein the communication path is a telephone line of the public switched telephone network.

33. A method according to claim 30 wherein the communication path is an alternating current power supply line.

34. A method according to claim 30 wherein the communication path is a dedicated, direct line connection.

35. A method according to claim 30 wherein the first geographic coverage area at least partially overlaps the second geographic coverage area.

36. A method according to claim 30 wherein the first geographic coverage area does not overlap the second geographic coverage area.

37. A method according to claim 30 wherein the occurrence of the predetermined condition further comprises an expiration of a random time.

38. A method according to claim 30 wherein the occurrence of the predetermined condition further comprises an expiration of a predetermined time.

39. A method according to claim 30 wherein the occurrence of the predetermined condition further comprises at least one of the first base station and the second base station being temporarily disconnected from a power source.

40. A method according to claim 30 wherein the occurrence of the predetermined condition further comprises at least one of the first base station and the second base station being disconnected from the cordless telephone system.

41. A method according to claim 30 further comprising the steps of:

determining whether the first base station is within the second geographic coverage area of the second base station; and determining whether the second base station is within the first geographic coverage area of the first base station.

42. A method according to claim 41:

wherein the step of determining whether the first base station is within the second geographic coverage area of the second base station further comprising the steps of:

transmitting a first signal by the first base station; and receiving the first signal by the second base station; and wherein the step of determining whether the second base station is within the first geographic coverage area of the first base station further comprising the steps of:

transmitting a second signal by the second base station responsive to receiving the first signal; and receiving the second signal by the first base station.

43. A method according to claim 30 further comprising the steps of:

assigning a system security code to at least the first base unit responsive to the first controller of the first base station being configured as the master controller.

44. A method according to claim 30 further comprising the steps of:

exchanging data between the first base station and the second base station responsive to the first controller of the first base station being configured as the slave controller.

\* \* \* \* \*